(12) United States Patent
Kröger et al.

(10) Patent No.: US 8,672,252 B2
(45) Date of Patent: Mar. 18, 2014

(54) SEAT BELT RETRACTOR WITH SENSOR CUTOFF

(75) Inventors: Doris Kröger, Tornesch (DE); Michael Tohn, Leezen (DE); Klaus Butenop, Herzhorn (DE)

(73) Assignee: Autoliv Development AB, Väräda (SE)

( * ) Notice: Subject to any disclaimer, the term of this patent is extended or adjusted under 35 U.S.C. 154(b) by 611 days.

(21) Appl. No.: 12/994,372

(22) PCT Filed: May 20, 2009

(86) PCT No.: PCT/EP2009/003591
§ 371 (c)(1),
(2), (4) Date: Nov. 23, 2010

(87) PCT Pub. No.: WO2009/143984
PCT Pub. Date: Dec. 3, 2009

(65) Prior Publication Data
US 2011/0073699 A1    Mar. 31, 2011

(30) Foreign Application Priority Data
May 27, 2008    (DE) .......................... 10 2008 025 431

(51) Int. Cl.
*B60R 22/38*    (2006.01)

(52) U.S. Cl.
USPC .................. 242/383.1; 242/383.2; 242/384.6

(58) Field of Classification Search
USPC ................................. 242/383.1–383.2, 384.6
See application file for complete search history.

(56) References Cited

U.S. PATENT DOCUMENTS

| | | | | |
|---|---|---|---|---|
| 4,767,082 A | * | 8/1988 | Schmidt et al. | 242/382.2 |
| 5,348,248 A | * | 9/1994 | Butenop | 242/383.2 |
| 5,794,879 A | * | 8/1998 | Huber | 242/382.2 |
| 5,826,813 A | * | 10/1998 | Hibata | 242/383.1 |
| 6,691,943 B2 | * | 2/2004 | Smithson et al. | 242/383.2 |
| 7,681,825 B2 | * | 3/2010 | Sumiyashiki | 242/383.1 |

FOREIGN PATENT DOCUMENTS

| DE | 10 027 134 A1 | 7/2001 |
|---|---|---|
| DE | 10 0360 032 A1 | 3/2006 |
| EP | 1 391 357 | 2/2004 |
| GB | 2 294 384 A | 5/1996 |
| GB | 2 295 957 | 6/1996 |

OTHER PUBLICATIONS

PCT/EP2009/003591—International Search Report—Sep. 3, 2009.

* cited by examiner

*Primary Examiner* — Sang Kim
(74) *Attorney, Agent, or Firm* — Brinks Gilson & Lione

(57) ABSTRACT

A self-locking belt retractor in particular for motor vehicles with a vehicle-sensitive and a webbing-sensitive control system for the blocking device of the belt retractor having an operatable toothed lock washer in a cased gearing.

5 Claims, 4 Drawing Sheets

SEAT BELT RETRACTOR WITH SENSOR CUTOFF

CROSS REFERENCE TO RELATED APPLICATIONS

This application claims priority to German Patent Application No. 10 2008 025 431.2, filed May 27, 2008, and PCT/EP2009/003591, filed May 20, 2009.

FIELD OF THE INVENTION

The invention concerns a self-locking belt retractor in particular for motor vehicles with a vehicle-sensitive and a webbing-sensitive control system for the blocking (locking) device of the belt retractor having an operatable toothed lock washer in a cased gearing, whereby the control system includes a cam disc rotating with the belt shaft, coupled to the toothed lock washer and inertially formed to form the webbing-sensitive controller with external gearing for the engagement of a sensor lever of a vehicle sensor arranged on the belt retractor, whereby at least one catch lever is provided controlled by the rotation of the belt shaft and rotatable between an engaged and a disengaged position for switching the vehicle sensor off in a function range in which almost the whole of the seatbelt is retracted onto the belt shaft, and whereby a device is provided for switching the webbing-sensitive controller off as well in the above-mentioned function range of the belt retractor.

BACKGROUND OF THE INVENTION

A belt retractor with the above-mentioned characteristics is described in DE 103 60 032 A1. To prevent the blocking mechanism of the belt retractor triggering when the seat belt is retracted under the effect of the roller spring or braked abruptly at the end of the retraction path after the passenger has unfastened the seat belt, the familiar belt retractor already provides for a cutoff of both the webbing-sensitive and of the vehicle-sensitive control systems, so that an unwanted blocking of the belt shaft at the end of the seat belt's retraction path is prevented.

For this purposes the familiar belt retractor has a locking disc on the belt shaft and rotating with the belt shaft that controls a stationary catch lever on bearings rotatable relative to the housing by means of a guide curve formed on it that in a function range in which almost the whole of the seat belt is rolled onto the belt shaft as a direct effect on the sensor lever of the vehicle sensor that works together with the cam disc and immobilizes this and in this way switches the vehicle-sensitive control system off. Insofar as the webbing-sensitive control system is realized through a cam disc formed with appropriate inertia, to switch the webbing-sensitive control system off there is an additional lock on the belt shaft, which is coupled for its operations via a guide gate to the catch lever for switching the vehicle sensor off and engages with the cam disc in its blocking position brought about by the locking position of the catch lever and locks the cam disc torque-proof with the belt shaft.

The familiar belt retractor has the disadvantage that different levers are provided for switching off both the vehicle-sensitive and the webbing-sensitive control systems, which makes the structure of the belt retractor complicated and the construction cost is correspondingly high. In addition, the two control systems can only be switched off consecutively, because initially the operation of the catch lever for the vehicle sensor is a prerequisite for the control of the lock for the webbing-sensitive control system. Because several control procedures are necessary, a corresponding fault dependency cannot be ruled out.

In addition, it is already known from DE 100 27 134 A1 that with a belt retractor with an inert cam disc on the shaft extension the vehicle sensor is to be attached to the inside of a cover spanning the control system and the sensor lever of the vehicle sensor is to engage with the external gearing of the cam disc to control it.

SUMMARY OF THE INVENTION

The invention is based on the problem of simplifying a self-locking belt retractor with the characteristics in accordance with the previously mentioned type with regard to switching off both the vehicle-sensitive and the webbing-sensitive control systems and to improve the security of the switching off function.

The solution of this problem results including advantageous embodiments and further formations of the invention from the contents of the patent claims, which follow this description.

The invention provides in detail that a cap spanning the control system and fixed to the belt retractor housing has a catch lever controlled by a counter transmission mounted on it that switches off with a single switching action both the vehicle sensor mounted on the cap and an inertia mass mounted on the cam disc that be rotated from an inertia control position into a blocking position for the cam disc. Insofar as, in contrast to the state of the art, the inertia mass of the cam disc is formed by an inertia mass mounted movably on the cam disc, this results in the advantageous function of switching both the vehicle sensor and the inertia mass off at the same time through a single catch lever. This means that the invention has the advantage that only a single component and a single switching action is necessary to switch both control systems off together. Because this catch lever is also mounted on the cap in the same way as the vehicle sensor, the cap is the bearer for several components that are necessary for the function of the belt retractor, so that the design of the belt retractor is simplified on the whole as well.

According to an embodiment of the invention it is planned for a connector ring having both external and internal gearing to be mounted rotatable on the cap, whereby the inertia mass of the cam disc is controlled in its blocking position for the cam disc in engagement with the internal gearing of the connector ring and the catch lever can be reversed by the counter transmission between an engagement position with the external gearing of the connector ring and a release position. Insofar therefore that the inertia mass requires a non-rotatable fixed connector ring as thrust bearing for its function as a webbing-sensitive controller, the switching on or off of the webbing-sensitive control system takes place through the catch lever either immobilizing the connector ring or letting it rotate.

With regard to the switching on or off of the vehicle sensor according to an embodiment of the invention it is planned for the catch lever to be mounted on the cap in such a way that in its switching off position for the vehicle sensor the catch lever immobilizes the sensor lever of the vehicle sensor. If the sensor lever of the vehicle sensor is immobilized by the catch lever, it cannot engage with the external gearing of the cam disc, so that the vehicle-sensitive control system is switched off.

In particular in accordance with an embodiment of the invention it is therefore planned that the catch lever in its switching off position for the webbing-sensitive and the vehicle-sensitive control system is controlled outside engagement with the external gearing of the connector ring and in this position also immobilizes the sensor lever of the vehicle sensor.

According to an embodiment of the invention, the catch lever is designed as a rocker mounted on the outside of the cap and moved in a reciprocating fashion by the counter transmission that with a function range bent at a right angle reaches through the cap in a recess and grips the external gearing of the connector ring and the sensor lever of the vehicle sensor. This enables a compact design of the belt retractor.

According to an embodiment of the invention it is planned that the counter transmission consists in a familiar manner of a number of interlocking cogs coupled to the belt shaft on which the trip cams are mounted that cause the respective switching of the catch lever.

BRIEF DESCRIPTION OF THE DRAWINGS

The drawings show an embodiment of the invention that is described below. The following is shown.

DETAILED DESCRIPTION OF THE INVENTION

Figure 1A:
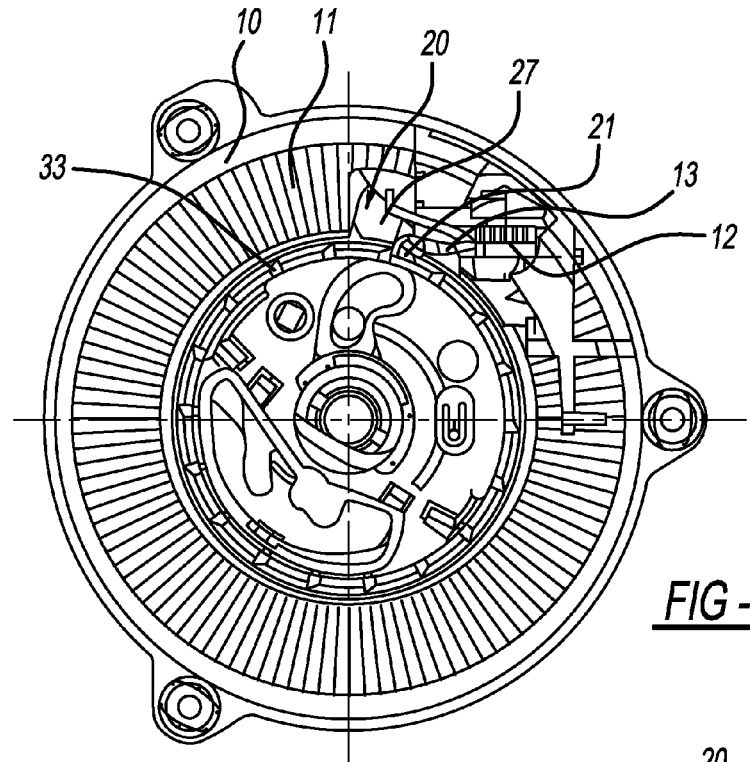
FIGS. 1a, and 1b show the webbing-sensitive and the vehicle-sensitive control system of a self-locking belt retractor including the device for switching this on and off in a schematic representation with the sensor technology switched on, FIGS. 2a, and 2b are similar to FIGS. 1a and 1b showing the sensor system switched off.
Figure 1B:
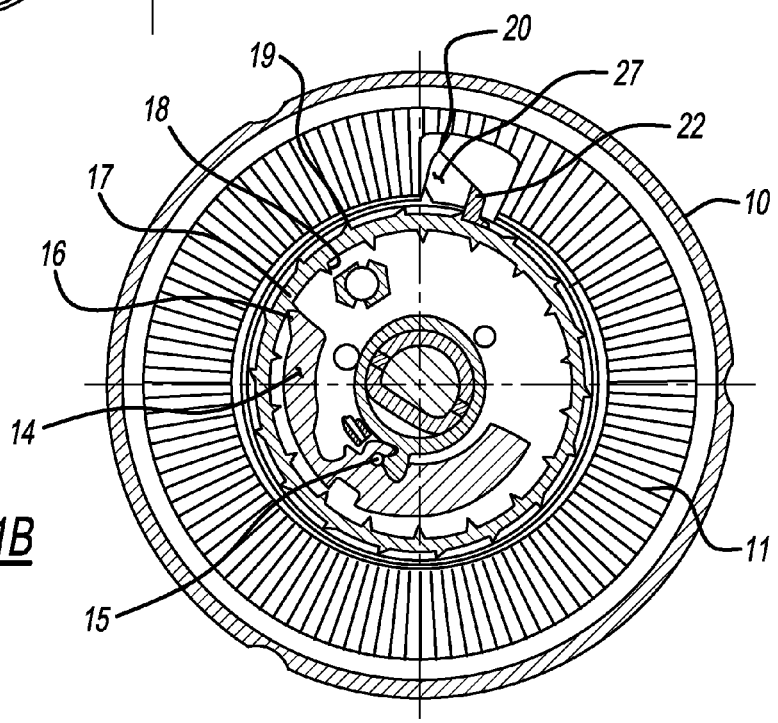
Figure 4:
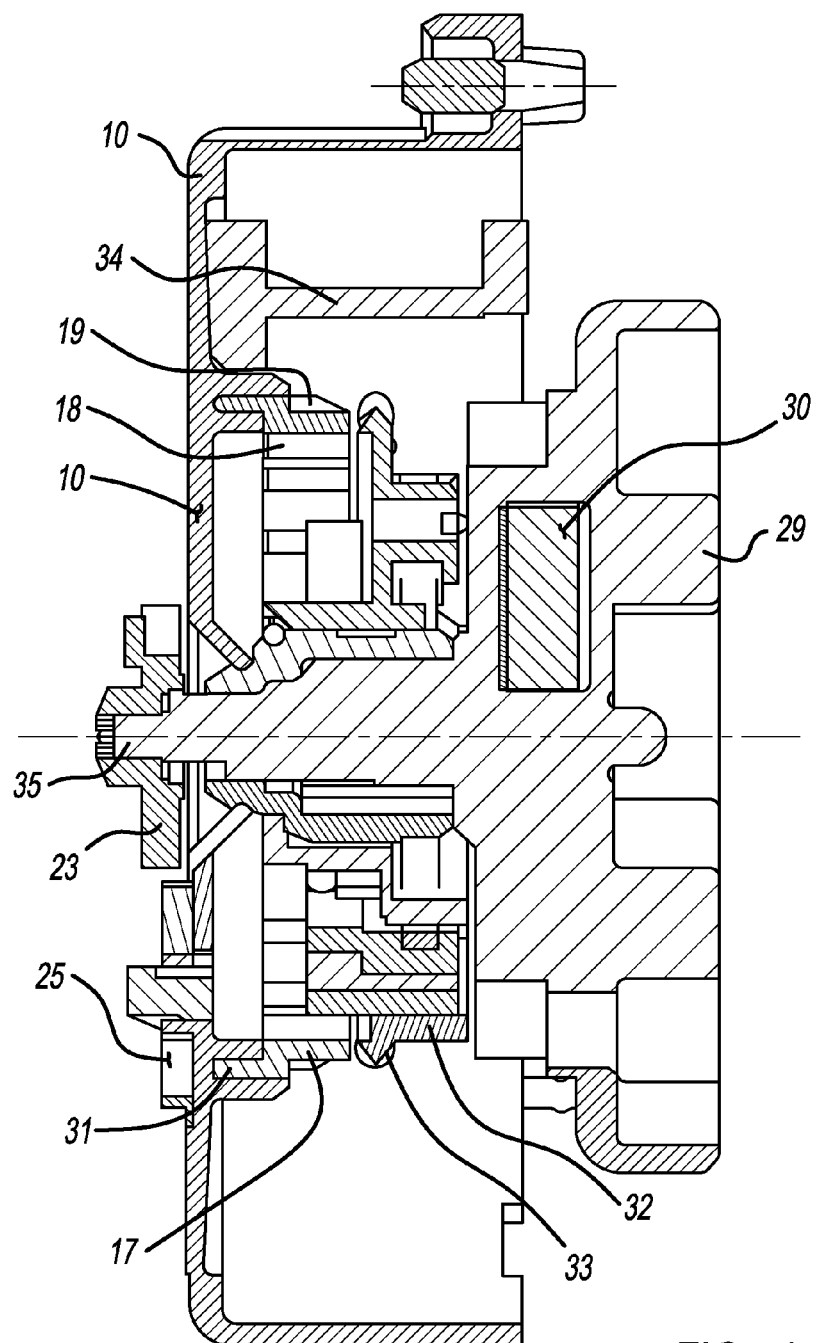
FIG. 4 shows the system side of the belt retractor in accordance with FIGS. 1 to 3 in cross-section.

FIGS. 1a and 1b each show the system side of a belt retractor in a view from the belt shaft to the inside of a cap 10 as the bearer of function parts of the belt retractor. On the inside of the cap 10 an axial gearing 11 for immobilizing a vehicle sensor 12 by means of an adapter 34 that can be seen in FIG. 4 is shown in different positions. The vehicle sensor 12 has a sensor lever 13 that is controlled as part of the webbing-sensitive and of the vehicle-sensitive control systems when the vehicle sensor 12 is triggered in engagement with the external gearing 33 of a cam disc not shown in FIGS. 1a and 1b. This cam disc 32 can be seen more clearly in FIG. 4.

The webbing-sensitive control system of the belt retractor is formed by an inertia mass 14 having a blocking tooth 16 at an outer end and mounted on cam disc 32 rotating around a bearing 15 and projecting over the plane of cam disc 32 into the plane enclosed by the cap 10.

A rotating connector ring 17 having an internal gearing 18 and an external gearing 19 is mounted in the cap 10. The internal gearing 18 is designed so that the inertia mass 14 can engage with the internal gearing 18 with its blocking tooth 16 in its one function position that is still to be described.

A catch lever 20 is mounted on the cap 10 in such way that in its two function positions that still have to be described. The catch lever 20 engages or disengages with the external gearing 19 of the connector ring 17 by means of the stopper 22 and in this way immobilizes or releases the connector ring 17. In addition, the catch lever 20 has a cam 21 that is mounted in such a way that in its corresponding function position the catch lever 20 immobilizes the sensor lever 13 via the surface of cam 21 at the sensor lever 13 of the vehicle sensor 12 in such a way that this cannot engage with the external gearing 33 of the cam disc 32 (FIG. 4).

FIGS. 1a and 1b show the respective engagement position for both the webbing-sensitive and the vehicle-sensitive control system. In this engagement position, the catch lever 20 with its stopper 22 engages with the external gearing 19 of the connector ring 17 and in this way immobilizes it. If there is a corresponding rotational acceleration in this engagement position of the cam disc 32 coupled with the belt shaft 29, because of the moment of inertia the inertia mass 14 is deflected and engages with its blocking tooth 16 in the internal gearing 18 of the connector ring 17 which is immobilized unrotatably through the catch lever 20. In this way the cam disc 32 is stopped in its rotational movement and this results in a relative rotation between cam disc 32 and belt shaft 29, and this relative movement is converted in way that is familiar from generic belt retractors into a deflection of the toothed lock washer 30 (FIG. 4) into a gearing fixed in a housing and thus into a blocking of the rotational movement of belt shaft 29.

At the same time according to FIG. 1a, the cam 21 of the catch lever 20 is outside the range of movement of the sensor lever 13 of the vehicle sensor 12, so that with corresponding vehicle decelerations or vehicle accelerations, the vehicle sensor 12 can control the sensor lever 13 in engagement with the external gearing 33 of the cam disc 32. In this way, the cam disc 32 is also stopped in its rotational movement, whereby the control of the toothed lock washer 30 is effected.

Figure 2A:
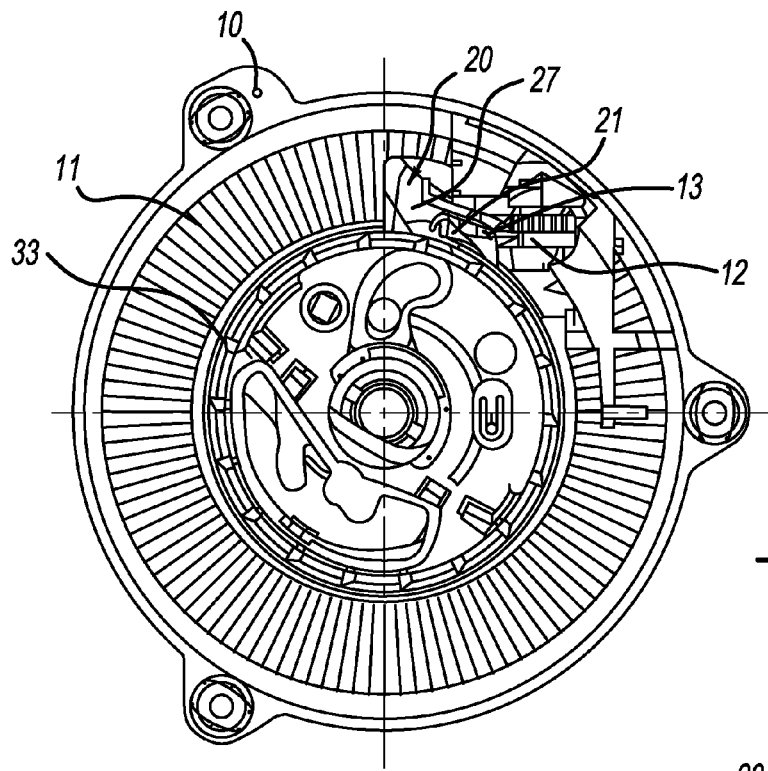
Figure 2B:
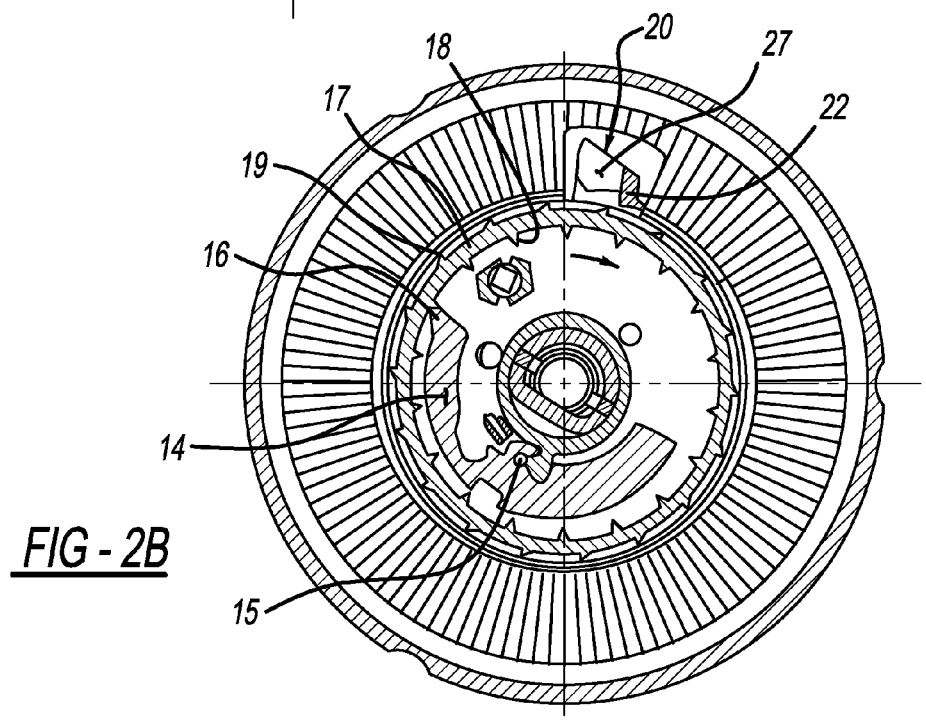
Figure 3:
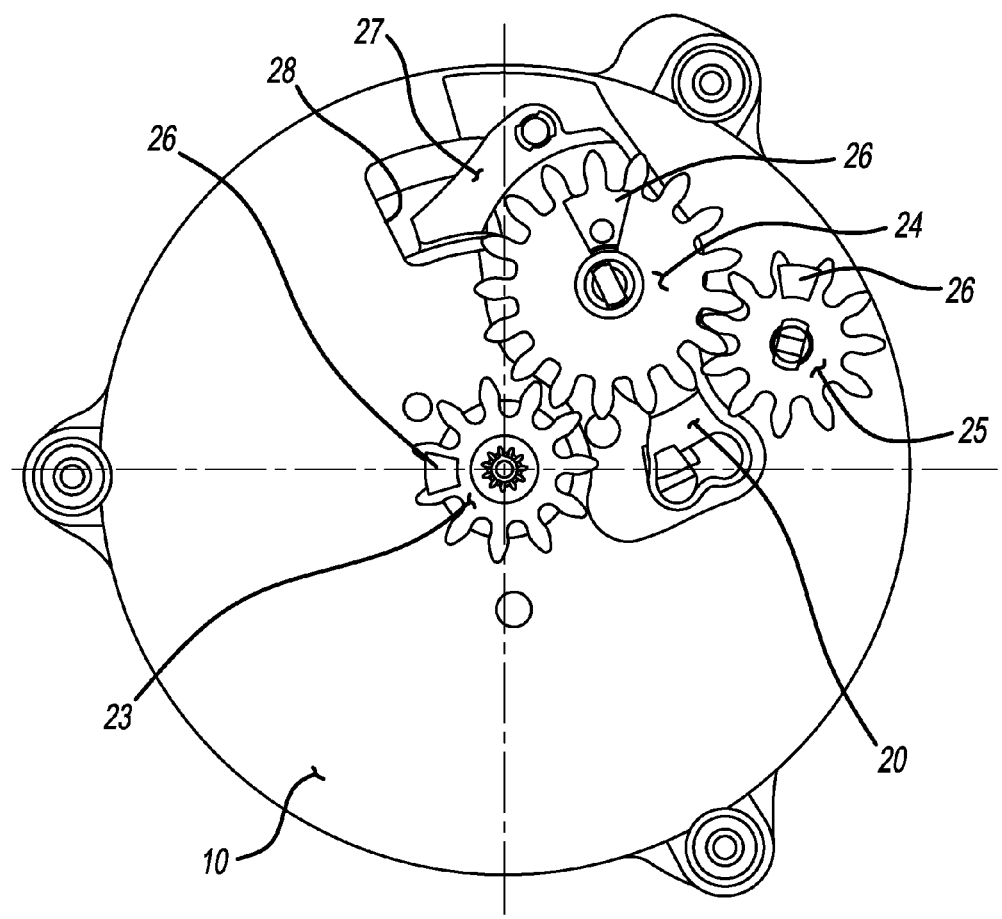
FIG. 3 is a top view of the cap of the belt retractor with the counter transmission mounted thereon and the catch lever controlled by this.

FIGS. 2a and 2b show correspondingly the simultaneous disconnection of the webbing-sensitive and of the vehicle-sensitive control system through the reversal of the catch lever 20 in its disconnection position. As shown in FIG. 2b, the catch lever 20 with its stopper 22 is disengaged with the external gearing 19 of the connector ring 17, so that the connector ring 17 can rotate. If the blocking tooth 16 of the inertia mass 14 engages with the internal gearing 18 of the connector ring 17, the thus deflected inertia mass 14 does not find a thrust bearing in the rotating connector ring 17, so that connector ring 17, inertia mass 14 and cam disc 32 continue to rotate together with belt shaft 29. Because of a lack of a relative movement between cam disc 32 and belt shaft 29 a deflection of toothed lock washer 30 and thus a blocking of belt shaft 29 does not take place. The webbing-sensitive control system is thus disconnected.

According to FIG. 1a in this disconnected position of the catch lever 20 its cam 21 immobilizes the sensor lever 13 in a position in which the sensor lever 13 cannot engage with the external gearing 33 of the cam disc 32. Insofar, with corresponding vehicle decelerations or vehicle accelerations, a blocking of the rotational movement of the cam disc 32 and thus its relative movement to the belt shaft 29 does not take place. The vehicle-sensitive control system is disconnected.

The switching in a reciprocating fashion of the catch lever 20 between the function positions of the catch lever 20 described above in accordance with FIGS. 1a and 1b and FIGS. 2a and 2b is controlled via a counter transmission mounted on the outside the cap 10. For this purpose the belt shaft 29, as can be seen in FIG. 4, passes through the cap 10 with a shaft extension 35, on which is mounted a shaft cog 23 that rotates with the belt shaft 29. The shaft cog 23 is in constant meshed engagement with a rocker cog 24 mounted on the catch lever 20, which is designed as rocker than can be moved in a reciprocating fashion, the said rocker cog 24 being in meshed engagement with another rocker cog 25 fixed rotatably on the cap 10. Trip cams 26 are mounted on all three cogs 23, 24, and 25 that on the given protraction or retraction statuses of the webbing come into contract with each other in dependence on the rotation movements of the belt shaft 29 so that this enables the catch lever 20, which is designed as a rocker, can be switched between its function positions. This switching principle is sufficiently known from the state of the art. The catch lever 20 mounted in the form of a rocker on the outside of the cap 10 passes through the cap 10 in an assigned recess 28 with an offset section 27 and forms the stopper 22 and the cam 21 at its offset section 27 that projects into the level enclosed by the cap 10.

The features of the object of these documents disclosed in the above description, the patent claims, the summary and the drawings can be essential for the realization of the invention in its various embodiments either individually and in any combinations with one another.

While the above description constitutes the preferred embodiment of the present invention, it will be appreciated that the invention is susceptible to modification, variation and change without departing from the proper scope and fair meaning of the accompanying claims.

The invention claimed is:

1. A self-locking belt retractor for motor vehicles, with a vehicle-sensitive and a webbing-sensitive control system for a blocking device having a toothed lock washer (30) engageable with gearing fixed in a housing, wherein the control system comprises:
   a cam disc (21) rotating with a belt shaft (29), coupled to the lock washer and forming the webbing-sensitive control system, the cam disc having an external gearing for the engagement of a sensor lever (13) of a vehicle sensor arranged on the belt retractor,
   a connector ring (17) fitted with both an external gearing (19) and with an internal gearing (18)
   an inertia mass mounted on the cam disc and pivotable from an non-blocking position into a blocking position in which the inertia mass engages with the internal gearing of the connector ring for webbing-sensitive control, wherein the connector ring is coupled to the housing during the webbing-sensitive control;
   at least one catch lever (20) reversibly pivotable about an axis fixed to the housing dependent on rotational positions of the belt shaft, the catch lever being pivotable between an engaged position and a disengaged position for switching the vehicle-sensitive control system off in a function range corresponding to a rotational position of the belt shaft in which almost the whole of a seatbelt wrapped on the belt shaft is retracted onto the belt shaft, the catch lever having a lever arm with an end tip, which with a single action, disables in the disengaged position the vehicle-sensitive control system fixed on the cap (10) by abutting the sensor lever with the end tip and thus preventing an engagement of the sensor lever with the cam disc, and also disables the webbing-sensitive control by disengaging the end tip from an outer gearing of the connector ring, thereby decoupling the connector ring from the housing.

2. The Self-locking belt retractor in accordance with claim 1 further comprising that the catch lever (20) is mounted on the cap (10) in such a way that in the disengaged position, the catch lever (20) immobilizes the sensor lever (13) of the vehicle sensor (12).

3. The self-locking belt retractor in accordance with claim 1 further comprising that in the disengaged position, the catch lever (20) is disengaged from the external gearing (19) of the connector ring (17) and in this position also immobilizes the sensor lever (13) of the vehicle sensor (12).

4. The self-locking belt retractor in accordance with claim 1 further comprising that the catch lever (20) is formed as a rocker mounted on the outside of the cap (10) and movable by a counter transmission in a reciprocating fashion which with a functional area (27) reaches through the cap (10) in a recess (28) and engages the external gearing (19) of the connector ring (17) and the sensor lever (13) of the vehicle sensor (12).

5. The self-locking belt retractor in accordance with claim 1 further comprising that the counter transmission consists of a number of interlocking cogs (23, 24, 25) coupled to the belt shaft (29) on which trip cams (26) are mounted that cause the respective switching of the catch lever (20).

\* \* \* \* \*